United States Patent [19]

Tone et al.

[11] 4,371,662
[45] Feb. 1, 1983

[54] THREE-COMPONENT RESIN COMPOSITIONS HAVING IMPROVED COATING PROPERTIES

[75] Inventors: Fumihiro Tone; Toshihiko Fujishima, both of Sodegaura, Japan

[73] Assignee: Idemitsu Petrochemical Co., Ltd., Tokyo, Japan

[21] Appl. No.: 294,399

[22] Filed: Aug. 19, 1981

[30] Foreign Application Priority Data

Sep. 1, 1980 [JP] Japan ............... 55/119696
Sep. 13, 1980 [JP] Japan ............... 55/127539
Sep. 13, 1980 [JP] Japan ............... 55/127540

[51] Int. Cl.³ ............... C08L 23/16; C08L 53/02; C08L 53/00
[52] U.S. Cl. ............... 525/89; 525/71; 525/93
[58] Field of Search ............... 525/88, 93, 89, 71

[56] References Cited

U.S. PATENT DOCUMENTS 3,478,128 11/1969 Hagemeyer et al. ............... 525/88
4,247,661 1/1981 Herman et al. ............... 525/88

Primary Examiner—Carman J. Seccuro
Attorney, Agent, or Firm—Frishauf, Holtz, Goodman & Woodward

[57] ABSTRACT

A resin composition having improved coating properties which comprises (A) 67 to 91% by weight of an ethylene-propylene block copolymer and (B) 33 to 9% by weight of an ethylene-propylene rubber having a Mooney viscosity ($ML_{1+4}$, 100° C.) of 18 to 34 and, if necessary, (C) 3 to 15 parts by weight of an unsaturated carboxylic acid-modified polybutadiene or a styrene-based elastomer per 100 parts by weight of the total of Components (A) and (B). The resin composition has excellent flowability and coating properties. A mold produced from the resin composition can be uniformly coated with a paint without either special pretreatment or a degreasing treatment. These characteristic features are improved in the composition comprising Components (A), (B) and (C).

7 Claims, No Drawings

THREE-COMPONENT RESIN COMPOSITIONS HAVING IMPROVED COATING PROPERTIES

BACKGROUND OF THE INVENTION

The present invention relates to a resin composition having improved coating properties and more particularly to a resin composition having improved coating properties which is composed of a specific ethylene-propylene block copolymer and a specific ethylene-propylene rubber and furthermore, if necessary, an unsaturated carboxylic acid-modified polybutadiene or a styrene-based elastomer in a specific proportion.

Polypropylene-based resins are widely used in various fields since they have excellent mechanical properties, and are inexpensive and easily moldable. With these polypropylene-based resins, however, difficulties are encountered in applying fabricating techniques such as adhesion, printing and coating on the surface of a mold since they are chemically inert, have no polar group in the molecule, and have poor solubilities in solvents.

In general, therefore, the surface of a mold has been subjected to specific pre-treatments such as a sand blast treatment, a flame treatment, a corona treatment and an oxidation treatment using a mixed solution of chromic acid and sulfuric acid prior to the coating treatment, for example. These pretreatments, however, are not suitable for practical use since they require very complicated procedures and furthermore the effect is not sufficient.

In order to remove the above described disadvantages of polypropylene-based resins, various methods have recently been proposed. Some of such proposed methods are described below:

(1) An ethylene-propylene rubber is added to high crystalline polypropylene to improve the coating properties thereof as disclosed in Japanese Patent Publication No. 23535/1973. This method, however, suffers from the serious disadvantage that the effect of improving the coating properties is not sufficient unless an oxidation treatment using a mixed solution of chromic acid and sulfuric acid is further applied at low temperatures. Furthermore, the addition of the ethylene-propylene rubber to polypropylene gives rise to the problem that the flowability during molding is reduced.

(2) Polybutadiene is added to polypropylene as disclosed in Japanese Patent Publication No. 42568/1977.

(3) A 1,2-butadiene polymer is added to polypropylene as disclosed in Japanese patent application laid-open No. 153854/1979.

(4) Polybutadiene, and a styrene-based resin or an acrylic polymer are added to polypropylene as disclosed in Japanese patent application laid-open Nos. 789/1980 and 141854/1977.

(5) To the polypropylene resin composition as prepared in (4) above is further added polybutadiene containing functional groups such as hydroxyl groups, carboxyl groups, glycidyl groups, amino groups, and amido groups at the end groups thereof, as disclosed in Japanese patent application laid-open No. 141854/1977.

(6) Polybutadiene and a 1,2-butadiene polymer containing functional groups as described in (5) above at the end groups thereof are added to polypropylene as disclosed in Japanese patent application laid-open No. 27453/1977.

All the methods described in (2) to (6) above have the disadvantage that a degreasing treatment using a solvent is essential to be carried out prior to the coating.

(7) A styrene-butadiene copolymer is kneaded with polypropylene to improve the coating properties of a mold obtained as disclosed in Japanese patent publication Nos. 42568/1977 and 24350/1975. This method, however, has the disadvantage that delamination readily occurs in the mold obtained.

SUMMARY OF THE INVENTION

An object of the invention is to provide a resin composition from which a mold having a surface showing excellent coating properties can be produced without a specific pretreatment.

Another object of the invention is to provide a resin composition which shows good flowability during molding.

A further object of the invention is to provide a resin composition from which a mold having excellent mechanical strength can be produced.

Still another object of the invention is to provide a resin composition from which a mold having excellent impact resistant properties at low temperatures can be produced.

It has been found according to the invention that the objects can be attained by blending a specific ethylene-propylene copolymer, an ethylene-propylene rubber having a low Mooney viscosity, and furthermore, if necessary, a specific modified polybutadiene or styrene-based elastomer in a specific proportion.

The present invention, therefore, provides a resin composition comprising:

(A) 67 to 91% by weight of an ethylene-propylene block copolymer; and (B) 33 to 9% by weight of an ethylene-propylene rubber having a Mooney viscosity ($ML_{1+4}$, 100° C.) of 18 to 34, and also a resin composition comprising:

(A) 67 to 91% by weight of an ethylene-propylene block copolymer;

(B) 33 to 9% by weight of an ethylene-propylene rubber having a Mooney viscosity ($ML_{1+4}$, 100° C.) of 18 to 34; and (C) 3 to 15 parts by weight of an unsaturated carboxylic acid-modified polybutadiene or a styrene-based elastomer per 100 parts by weight of Components (A) and (B).

DETAILED DESCRIPTION OF THE INVENTION

With the Component (A) of the invention, i.e., the ethylene-propylene block copolymer, the ethylene unit content, melt index and the like can be appropriately determined depending on the purpose for which ultimate resin composition is used. The ethylene unit content is usually 20% by weight or less and preferably 6 to 10% by weight, and the melt index is preferably within the range of 1.8 to 10 grams per 10 minutes. When the melt index is less than 1.8 grams per 10 minutes, the flowability of the resin composition is undesirably too poor, whereas when it is more than 10 grams per 10 minutes, there is no uniformity in the luster of a mold. Thus, as described above, the preferred range of the melt index is between 1.8 grams per 10 minutes and 10 grams per 10 minutes. In particular, when the melt index is within the range of 8 to 10 grams per 10 minutes, the flowability the resin composition is appropriate and the appearance of a mold is very beautiful, and when the melt index is within the range of 1.8 to 4 grams per 10 minutes, the low temperature impact resistance strength of a mold after coating is very great.

If a propylene homopolymer or an ethylene-propylene random copolymer is used as the Component (A), the low temperature impact resistance of a mold obtained is poor, and the objects of the invention cannot be attained.

The Component (B) of the invention, i.e., the ethylene-propylene rubber should have a Mooney viscosity $(ML_{1+4}, 100°\ C.)$ of 18 to 34. When the Mooney viscosity $(ML_{1+4}, 100°\ C.)$ is less than 18, the low temperature impact resistance strength is poor, whereas when it is more than 34, the coating properties of the surface of a mold are deteriorated.

The propylene unit content of the ethylene-propylene rubber is not limited. Usually, however, the propylene unit content should be adjusted within the range of 20 to 50% by weight, and preferably within the range of 20 to 35% by weight.

The ethylene-propylene rubber as used herein may be not only a copolymer of ethylene and propylene, but also a terpolymer of ethylene, propylene and a diene, such as ethylidenenorbornene, 1,4-hexadiene and dicyclopentadiene.

In one embodiment of the invention, the resin composition of the invention comprises 67 to 91% by weight of Component (A) and 33 to 9% by weight of Component (B). When the proportion of Component (B) is less than 9% by weight, the coating properties of a mold are poor, whereas when it is more than 33% by weight, the moldability of the resin composition is reduced and at the same time, the stiffness and heat resistance of a mold are seriously deteriorated.

In the other embodiment of the invention, the resin composition of the invention comprises 67 to 91% by weight of Component (A) and 33 to 9% by weight of Component (B), and 3 to 15 parts by weight of Component (C) per 100 parts by weight of Components (A) and (B). The Component (C) is, as described above, an unsaturated carboxylic acid-modified polybutadiene or styrene-based elastomer. The addition of the unsaturated carboxylic acid-modified polybutadiene as Component (C) greatly improves the coating properties of a mold. On the other hand, if unmodified polybutadiene is used in place of the modified polybutadiene, the coating properties of a mold are not almost improved.

Various unsaturated carboxylic acids can be used in the modification of polybutadiene, i.e., in the production of the unsaturated carboxylic acid-modified polybutadiene. Suitable examples of such unsaturated carboxylic acids include maleic acid, maleic anhydride, nadic anhydride, citraconic acid, crotonic acid, isocrotonic acid, mesaconic acid, itaconic acid, angelic acid, sorbic acid, itaconic anhydride, citraconic anhydride and acrylic acid. Of such unsaturated carboxylic acid-modified polybutadienes, a maleic anhydride-modified polybutadiene is particularly preferred.

These unsaturated carboxylic acid-modified polybutadienes can be prepared by various methods, and those modified polybutadienes available on the market can also be used.

The amount of the unsaturated carboxylic acid-modified polybutadiene as Component (C) being added should be within the range of 3 to 15 parts by weight per 100 parts by weight of Components (A) and (B). When the amount of the above modified polybutadiene being added is less than 3 parts by weight, the coating properties of a mold are not sufficiently improved, whereas when it is more than 15 parts by weight, the heat resistance of a mold is undesirably reduced.

Also, the addition of the styrene-based elastomer as Component (C) greatly improves the low temperature impact resistance strength and the coating properties of a mold. The amount of the styrene-based elastomer as Component (C) being added should be within the range of 3 to 15 parts by weight per 100 parts by weight of Component (A) and (B). When the amount of the styrene-based elastomer being added is less than 3 parts by weight, the coating properties of a mold are not sufficiently improved, whereas when it is more than 15 parts by weight, the delamination of a mold is liable to occur. Various styrene-based elastomers as Component (C) can be used in the invention. Suitable examples of such styrene-based elastomers include a styrene-butadiene-styrene copolymer, a styrene-isoprene-styrene copolymer, and a styrene-ethylene-butylene-styrene copolymer.

The resin composition of the invention is prepared by mixing or blending the above described Components (A), (B) and (C) in the given proportion and then kneading the resulting mixture by the use of a mixer or extruder, e.g., a Banbury mixer and a cokneader. In mixing the Components (A), (B) and (C), various methods including a melt mixing operation, such as a one-stage melt mixing method, a multi-stage melt mixing method, and a combined method of dry blend and melt mixing are usually employed.

The thus obtained resin composition is molded by injection molding, extrusion molding or the like to produce a desired molded product. The mold thus obtained can be immediately coated without either special pretreatments or a degreasing treatment using a solvent. Furthermore, the mold has excellent impact strength at low temperatures. Moreover, the resin composition of the invention has suitable flowability and therefore, excellent moldability.

The resin composition of the invention is excellent in any of moldability (flowability), and the coating properties and impact resistance of a mold produced therefrom, and it is thus very useful. The mold produced from the resin composition of the invention is excellent in adhesion, dyeability and dry platability as well as in coatability.

The resin composition of the invention, therefore, can be widely and effectively used for the production of industrial parts for use in electric appliances and cars, parts for use in general apparatuses, and miscellaneous goods and wrapping materials on which surface decoration is to be applied.

The following examples and comparative examples are given to illustrate the invention in greater detail.

EXAMPLES 1 TO 3 AND COMPARATIVE EXAMPLES 1 AND 2

In these examples, an ethylene-propylene block copolymer (melt index (MI): 9.3 grams per 10 minutes; ethylene unit content: 9.0% by weight) and an ethylene-propylene rubber (Mooney viscosity $(ML_{1+4}, 100°\ C.)$: 23; propylene unit content: 25% by weight) were used as Components (A) and (B), respectively.

Components (A) and (B) were mixed in a tumbler in the proportions shown in Table 1, and kneaded and formed into pellets at a set temperature of 220° C. by the use of a monoaxial extruder having a diameter of 40 millimeters. These pellets were injection-molded to produce a plate-like specimen. This specimen was coated with an acryl-urethane based paint, and the coating property was evaluated by various testing methods. The results are shown in Table 1. In addition, the flowability of the resin composition and the impact resistance strength of the mold were measured, and the results are shown in Tables 3 and 4.

EXAMPLE 4

The procedure of Examples 1 to 3 was repeated with the exception that an ethylene-propylene block copolymer (MI: 2.5 grams per 10 minutes; ethylene unit content: 9.0% by weight) was used as Component (A) in place of the ethylene-propylene block copolymer (MI: 9.3 grams per 10 minutes; ethylene unit content: 9.0% by weight). The results are shown in Tables 1 and 4.

COMPARATIVE EXAMPLE 3

An ethylene-propylene block copolymer (MI: 9.3 grams per 10 minutes; ethylene unit content: 9.0% by weight) was injection-molded to produce a plate-like specimen. This specimen was coated in the same manner as in Examples 1 to 3. The coating property and the flowability of the resin composition were determined in the same manner as in Examples 1 to 3. The results are shown in Tables 2 and 3.

COMPARATIVE EXAMPLE 4

The procedure of Examples 1 to 3 was repeated with the exception that an ethylene-propylene rubber (Mooney viscosity (ML$_{1+4}$, 100° C.): 70; propylene unit content: 25% by weight) was used in place of the ethylene-propylene rubber (Mooney viscosity (ML$_{1+4}$, 100° C.): 23; propylene unit content: 25% by weight) used in Example 2. The coating property and the flowability of the resin composition were determined in the same manner as in Examples 1 to 3. The results are shown in Tables 2 and 3.

COMPARATIVE EXAMPLE 5

The procedure of Examples 1 to 3 was repeated with the exception that an ethylene-propylene random copolymer (MI: 8 grams per 10 minutes; ethylene unit content: 5.0% by weight) was used in place of the ethylene-propylene block copolymer used in Examples 1 to 3. The coating property was determined in the same manner as in Examples 1 to 3, and the results are shown in Table 2.

TABLE 1

| | Comparative Example 1 | Example 1 | Example 2 | Example 3 | Comparative Example 2 | Example 4 |
|---|---|---|---|---|---|---|
| (Evaluation of Coating Property) | | | | | | |
| Composition | | | | | | |
| Component (A) (% by weight) | 95 | 91 | 77 | 67 | 63 | 77 |
| Component (B) (% by weight) | 5 | 9 | 23 | 33 | 37 | 23 |
| Coating Property | | | | | | |
| Checked Tape Test*1 | 10/100 | 79/100 | 100/100 | 100/100 | 100/100 | 100/100 |
| Water Resistance Test*2 | 0/100 | 86/100 | 100/100 | 100/100 | 100/100 | 100/100 |
| Moisture Resistance Test*3 | 0/100 | 59/100 | 100/100 | 100/100 | 100/100 | 100/100 |
| Dupont Type Impact Test*4 | | | | | | |
| Room Temperature | Peeling of coating film | Peeling of coating film | No change in coating film | No change in coating film | Breakdown of material | No change in coating film |
| −40° C. | Peeling of coating film and material | Peeling of coating film | No change in coating film | No change in coating film | No change in coating film | No change in coating film |
| Gasoline Resistance Test*5 | 0/100 | 60/100 | 100/100 | 100/100 | 50/100 Swelling of material | 80/100 (Peeling from edge) |

*1 According to JIS-D-0202-1971.8.12 The surface of a 10 square millimeter test piece was cut into a hundred squares by the use of a razor blade. A 12 millimeter wide celophane tape was sticked onto the test piece and stripped apart in the right-angled direction relative to the surface of the test piece. The number of squares remaining unstripped was counted, and it is indicated in the table.
*2 After being soaked in hot water maintained at 40° C. for 240 hours, the test piece was subjected to the checked tape test.
*3 After being allowed to stand at 50° C. and 95% RH for 240 hours, the test piece was subjected to the checked tape test.
*4 After the application of an impact test (1,500 grams-30 centimeters; impact core: ½ inch), the test piece was subjected to the checked tape test.
*5 After being soaked in gasoline at room temperature for 3 hours, the test piece was subjected to the checked tape test.

TABLE 2

| (Evaluation of Coating Properties) | Comparative Example 3 | Comparative Example 4 | Comparative Example 5 |
|---|---|---|---|
| Coating Property | | | |
| Checked Tape Test*1 | 0/100 | 0/100 | 100/100 |
| Water Resistance Test*2 | 0/100 | 0/100 | 100/100 |
| Moisture Resistance Test*3 | 0/100 | 0/100 | 100/100 |
| Dupont Type Impact Test*4 | | | |
| Room Temperature | Peeling of coating film | Peeling of coating film | Breakdown of material |
| −40° C. | Peeling of coating film and breakdown of material | Peeling of coating film | Breakdown of material |
| Gasoline Resistance Test*5 | 0/100 | 0/100 | 50/100 |

*1, *2, *3, *4, *5 Same as in Table 1.

TABLE 3

| (Evaluation of Flowability) | | | | | |
|---|---|---|---|---|---|
| | Comparative Example 3 | Example 1 | Example 2 | Example 3 | Comparative Example 4 |
| Composition | | | | | |
| Component (A) | | | | | |

TABLE 3-continued
(Evaluation of Flowability)

|  | Comparative Example 3 | Example 1 | Example 2 | Example 3 | Comparative Example 4 |
|---|---|---|---|---|---|
| (% by weight) Component (B) | 100 | 91 | 77 | 67 | 77 |
| (% by weight) | 0 | 9 | 23 | 33 | 23* |
| Length of Spiral Flow (centimeters) | 88 | 84 | 80 | 77 | 72 |

*An ethylene-propylene rubber having a Mooney viscosity (ML$_{1+4}$, 100° C.) of 70 was used.
Note:
Injection Molding Machine: Model IS-90B produced by Toshiba Kikai Co., Ltd.
Evaluation Conditions: Arkimedes type 2.5 mm × 10 mm;
molding temperature: 240° C.;
injection pressure: 800 kg/cm$^2$.

TABLE 4
(Impact Resistance Strength after Coating)

|  | Example 2 | Example 4 |
|---|---|---|
| Dupont Impact Strength* (kilograms-centimeters) |  |  |
| Before coating | 65 | 70 |
| After coating | 40 | 62.5 |

*The Dupont Impact Strength is expressed in an energy value at which the test piece is not broken when it is tested under the conditions of an impact core of ½ inch, a temperature of −50° C., a load of 1,000 grams, and n = 4.

EXAMPLE 5

To a mixture of 77 parts by weight of an ethylene-propylene block copolymer (melt index (MI): 9.3 grams per 10 minutes; ethylene unit content: 9.0% by weight) as Component (A) and 23 parts by weight of an ethylene-propylene rubber (Mooney viscosity (ML$_{1+4}$, 100° C.): 23; propylene unit content: 25% by weight) as Component (B) was added a maleic anhydride-modified polybutadiene (produced by Idemitsu Petrochemical Co., Ltd.) in an amount of 5 parts by weight per 100 parts by weight of the total of Components (A) and (B). The mixture thus obtained was kneaded by the use of an intermix and then pelletized by the use of a sheet pelletizer.

The thus obtained pellets were injection-molded into a plate-like test piece. This test piece was coated with an acryl-urethane-based paint, and the coating property and impact resistance strength were evaluated by various testing methods. The results are shown in Table 5.

The critical surface tension before and after a degreasing treatment of the mold which had not yet been coated was measured, and the results are shown in Table 6.

EXAMPLE 6

The procedure of Example 5 was repeated with the exception that an ethylene-propylene block copolymer (MI: 2.5 grams per 10 minutes; ethylene unit content: 9.0% by weight) was used in place of the ethylene-propylene block copolymer (MI: 9.3 grams per 10 minutes; ethylene unit content: 9.0% by weight). The results are shown in Tables 5 and 6.

EXAMPLE 7

To 77 parts by weight of an ethylene-propylene block copolymer (MI: 2.5 grams per 10 minutes; ethylene unit content: 9.0% by weight) was added 23 parts by weight of an ethylene-propylene rubber (Mooney viscosity (ML$_{1+4}$, 100° C.): 23; propylene unit content: 25% by weight). The mixture was mixed in a tumbler and kneaded at a set temperature of 220° C. by the use of a monoaxial extruder to provide pellets. These pellets were molded and coated in the same manner as in Example 5. The coating property, impact resistance strength, and critical surface tension before and after a degreasing treatment of the mold before the coating were measured, and the results are shown in Tables 5 and 6.

EXAMPLE 8

The procedure of Example 7 was repeated with the exception that 67 parts by weight of an ethylene-propylene block copolymer (MI: 9.3 grams per 10 minutes; ethylene unit content: 9.0% by weight) and 33 parts by weight of the ethylene-propylene rubber (Mooney viscosity (ML$_{1+4}$, 100° C.): 23; propylene unit content: 25% by weight) were used. The coating property, impact resistance strength, and critical surface tension before and after a degreasing treatment of the mold before the coating were measured, and the results are shown in Tables 5 and 6.

TABLE 5
(Coating Property and Impact Resistance Strength)

|  | Example 5 | Example 6 | Example 7 | Example 8 |
|---|---|---|---|---|
| Coating Property |  |  |  |  |
| Checked Tape Test*[1] | 100/100 | 100/100 | 100/100 | 100/100 |
| Water Resistance Test*[2] | 100/100 | 100/100 | 100/100 | 100/100 |
| Gasoline Resistance Test*[3] | 100/100 | 100/100 | 80/100 (peeling from edge) | 100/100 |
| Dupont Type Impact Test*[4] |  |  |  |  |
| Room Temperature | No change in coating film | No change in coating film | No change in coating film | No change in coating film |
| −40° C. | No change in coating film | No change in coating film | No change in coating film | No change in coating film |
| Dupont Impact Strength*[5] (kg-cm) |  |  |  |  |
| Before Coating | — | 75 | 70 | — |

TABLE 5-continued

| (Coating Property and Impact Resistance Strength) | | | | |
|---|---|---|---|---|
| | Example 5 | Example 6 | Example 7 | Example 8 |
| After Coating | — | 65 | 62.5 | — |

*1, *2, *4 Same as in Table 1.
*3 After being soaked in gasoline at room temperature for 3 hours, the test piece was subjected to the checked tape test.
*5 An energy value at which the test piece was not broken when it was tested under the conditions of an impact core of ¼ inch, a load of 1,000 grams, n = 4, and a temperature of −50° C.

TABLE 6

| (Critical Surface Tension (wet index)*1) | | | | |
|---|---|---|---|---|
| | Example 5 | Example 6 | Example 7 | Example 8 |
| No Degreasing Treatment | 38 to 39 | 38 to 39 | 31 | 31 |
| After Degreasing Treatment*2 | 38 to 39 | 38 to 39 | 38 to 39 | 38 to 39 |

*1 According to JIS-K-6768.
*2 The surface of the mold was wiped with toluene.

EXAMPLE 9

To 77 parts by weight of an ethylene-propylene block copolymer (melt index (MI): 9.3 grams per 10 minutes; ethylene unit content: 9.0% by weight) as Component (A) and 23 parts by weight of an ethylene-propylene rubber (Mooney viscosity (ML$_{1+4}$, 100° C.): 23; propylene unit content: 25% by weight) as Component (B) was added a styrene-butadiene-styrene block copolymer (produced by Shell Chemical Corp.) as Component (C) in an amount of 5 parts by weight per 100 parts by weight of the total of Components (A) and (B). The resulting mixture was then mixed in a tumbler and then kneaded at a set temperature of 220° C. by the use of a monoaxial extruder having a diameter of 40 millimeters to provide pellets. These pellets were injection-molded to provide a test piece. This test piece was coated with an acryl-urethane-based paint, and the coating property and impact resistance strength were measured. The results are shown in Table 7.

EXAMPLE 10

The procedure of Example 9 was repeated with the exception that a styrene-isoprene-styrene block copolymer (produced by Shell Chemical Corp.) was used in place of the styrene-butadiene-styrene block copolymer. The results are shown in Table 7.

EXAMPLE 11

The procedure of Example 9 was repeated with the exception that a styrene-ethylene-butylene-styrene block copolymer (produced by Shell Chemical Corp.) was used in place of the styrene-butadiene-styrene block copolymer. The results are shown in Table 7.

EXAMPLE 12

The procedure of Example 9 was repeated with the exception that an ethylene-propylene block copolymer (MI: 2.5 grams per 10 minutes; ethylene unit content: 9.0% by weight) was used in place of the ethylene-propylene block copolymer (MI: 9.3 grams per 10 minutes; ethylene unit content: 9.0% by weight) used as Component (A). The results are shown in Table 8.

EXAMPLE 13

The procedure of Example 10 was repeated with the exception that an ethylene-propylene block copolymer (MI: 2.5 grams per 10 minutes; ethylene unit content: 9.0% by weight) was used in place of the ethylene-propylene block copolymer (MI: 9.3 grams per 10 minutes; ethylene unit content: 9.0% by weight) used as Component (A).

EXAMPLE 14

The procedure of Example 11 was repeated with the exception that an ethylene-propylene block copolymer (MI: 2.5 grams per 10 minutes; ethylene unit content: 9.0% by weight) was used in place of the ethylene-propylene block copolymer (MI: 9.3 grams per 10 minutes; ethylene unit content: 9.0% by weight) used as Component (A). The results are shown in Table 8.

COMPARATIVE EXAMPLES 6 AND 7

The procedure of Example 9 was repeated with the exception that the amounts of Components (A), (B) and (C) being added were changed. The results are shown in Table 7.

COMPARATIVE EXAMPLE 8

A mixture of 95 parts by weight of an ethylene-propylene block copolymer (MI: 9.3 grams per 10 minutes; ethylene unit content: 9.0% by weight) and 5 parts by weight of an ethylene-propylene rubber (Mooney viscosity (ML$_{1+4}$, 100° C.): 23; ethylene unit content: 25% by weight) was mixed in a tumbler and then kneaded at a set temperature of 220° C. by the use of a monoaxial extruder having a diameter of 40 millimeters to produce pellets. These pellets were molded and coated in the same manner as in Example 9. The coating property and impact resistance strength were measured, and the results are shown in Table 7.

EXAMPLE 15

A mixture of 77 parts by weight of an ethylene-propylene block copolymer (MI: 2.5 grams per 10 minutes; ethylene unit content: 9.0% by weight) and 23 parts by weight of an ethylene-propylene rubber (Mooney viscosity (ML$_{1+4}$, 100° C.): 23; ethylene unit content: 25% by weight) was kneaded, molded and coated in the same manner as in Example 9. The coating property and impact resistance strength were measured, and the results are shown in Table 8.

COMPARATIVE EXAMPLE 9

A mixture of 100 parts by weight of an ethylene-propylene block copolymer (MI: 9.3 grams per 10 minutes; ethylene unit content: 9.0% by weight) and 15 parts by weight of a styrene-butadiene-styrene block copolymer (produced by Shell Chemical Corp.) was mixed in a tumbler, and then kneaded at a set temperature of 220° C. by the use of a monoaxial extruder having a diameter of 40 millimeters to obtain pellets. These pellets were molded and coated in the same manner as in Example 9. The coating property and impact resistance strength were measured, and the results are shown in Table. 7.

EXAMPLE 16

The procedure of Example 15 was repeated with the exception that an ethylene-propylene block copolymer (MI: 9.3 grams per 10 minutes; ethylene unit content: 9.0% by weight) was used in place of the ethylene-propylene block copolymer (MI: 2.5 grams per 10 minutes; ethylene unit content: 9.0% by weight). The coating property and impact resistance strength were measured, and the results are shown in Table 7.

TABLE 7
(Coating Property and Impact Resistance Strength)

|  | Comparative Example 8 | Comparative Example 6 | Example 9 | Comparative Example 7 | Example 10 | Example 11 | Comparative Example 9 | Example 16 |
|---|---|---|---|---|---|---|---|---|
| Composition (parts by weight) | | | | | | | | |
| Polypropylene (MI: 9.3 grams per 10 minutes) | 95 | 95 | 77 | 63 | 77 | 77 | 100 | 77 |
| Ethylene-propylene Rubber | 5 | 5 | 23 | 37 | 23 | 23 | 0 | 23 |
| Styrene-based Elastomer | 0 | 5*1 | 5*1 | 5*1 | 5*2 | 5*3 | 15*1 | 0 |
| Coating Property | | | | | | | | |
| Checked Tape Test*4 | 10/100 | 81/100 | 100/100 | 100/100 | 100/100 | 100/100 | 100/100 | 100/100 |
| Water Resistance Test*5 | 0/100 | 87/100 | 100/100 | 100/100 | 100/100 | 100/100 | 53/100 | 100/100 |
| Moisture Resistance Test*6 | 0/100 | 60/100 | 100/100 | 100/100 | 100/100 | 100/100 | 100/100 | 100/100 |
| Dupont Impact Test*7 | | | | | | | | |
| Room Temperature | peeling of coating film | peeling of coating film | no change in coating film | breakdown of material | no change in coating film | no change in coating film | no change in coating film | no change in coating film |
| −40° C. | peeling of coating film, breakdown of material | peeling of coating film | no change in coating film | no change in coating film | no change in coating film | no change in coating film | no change in coating film | no change in coating film |
| Gasoline Resistance Test*8 | 0/100 | 63/100 | 100/100 | 70/100 | 100/100 | 100/100 | peeling of coating film | 100/100 |
| Izod Impact Strength (MD/TD) (kg-cm/cm) | | | | | | | | |
| 23° C. | 23/20 | 36/27 | 64/55 | 66/57 | 62/56 | 62/55 | — | 52/41 |
| −30° C. | 6/5 | 9/7 | 25/28 | 27/29 | 21/23 | 23/24 | — | 14/9 |

*1 Styrene-butadiene-styrene block copolymer.
*2 Styrene-isoprene-styrene block copolymer.
*3 Styrene-ethylene-butylene-styrene block copolymer.
*4, *5, *6, *7, *8 Same as *1, *2, *3, *4, *5 in Table 1.

TABLE 8
(Coating Property and Impact Resistance Strength)

|  | Example 12 | Example 13 | Example 14 | Example 15 |
|---|---|---|---|---|
| Composition (parts by weight) | | | | |
| Polypropylene (MI: 2.5 grams per 10 minutes) | 77 | 77 | 77 | 77 |
| Ethylene-propylene Rubber | 23 | 23 | 23 | 23 |
| Ethylene-based Elastomer | 5*1 | 5*2 | 5*3 | 0 |
| Coating Property | | | | |
| Checked Tape Test*4 | 100/100 | 100/100 | 100/100 | 100/100 |
| Water Resistance Test*5 | 100/100 | 100/100 | 100/100 | 100/100 |
| Gasoline Resistance Test*6 | 100/100 | 100/100 | 100/100 | 80/100 peeling from edge |
| Dupont Impact Strength (kg-cm)*7 | | | | |
| Before coating | 80 | 80 | 80 | 70 |
| After coating | 75 | 75 | 75 | 62.5 |

*1, *2, *3, *4, *5, *6, *7 Same as in Table 7.

What is claimed is:

1. A resin composition having improved coating properties which comprises (A) 67 to 91% by weight of an ethylene-propylene block copolymer, (B) 33 to 9% by weight of an ethylene-propylene rubber having a Mooney viscosity (ML$_{1+4}$, 100° C.) of 18 to 34, and (C) 3 to 15 parts by weight of a styrene-based elastomer selected from the group consisting of styrene-butadiene-styrene block copolymers, styrene-isoprene-styrene block copolymers, and styrene-ethylene-butylene-styrene block copolymers, per 100 parts by weight of the total of Components (A) and (B).

2. The resin composition as claimed in claim 1, wherein the ethylene-propylene block copolymer (A) has an ethylene unit content of 20% by weight or less and a melt index of 1.8 to 10 grams per 10 minutes.

3. A resin composition having improved coating properties which comprises (A) 67 to 91% by weight of an ethylene-propylene block copolymer, (B) 33 to 9% by weight of an ethylene-propylene rubber having a Mooney viscosity (ML$_{1+4}$, 100° C.) of 18 to 34, and (C) 3 to 15 parts by weight of an unsaturated carboxylic acid-modified polybutadiene per 100 parts by weight of the total of Components (A) and (B).

4. The resin composition as claimed in claim 3, wherein the unsaturated carboxylic acid-modified polybutadiene is a maleic anhydride-modified polybutadiene.

5. The resin composition as claimed in claim 3 or 4, wherein the ethylene-propylene block copolymer (A) has an ethylene unit content of 20% by weight or less and a melt index of 1.8 to 10 grams per 10 minutes.

6. The resin composition as claimed in claim 3 or 4, wherein the ethylene-propylene rubber (B) has a propylene unit content of 20 to 50% by weight.

7. The resin composition as claimed in claim 5, wherein the ethylene-propylene rubber (B) has a propylene unit content of 20 to 50% by weight.

* * * * *